US010487806B2

(12) United States Patent
Huot et al.

(10) Patent No.: US 10,487,806 B2
(45) Date of Patent: Nov. 26, 2019

(54) DEVICE AND A SHIP FOR MAINTAINING AN OFFSHORE WIND TURBINE

(71) Applicant: SAIPEM S.A., Montigny le Bretonneux (FR)

(72) Inventors: Emmanuel Huot, St Martin de Nigelles (FR); Carlo Chiodini, Pieve di Cadore-BL (IT); Liborio Moceri, Lommoye (FR); Romain Sylvestre, Montigny-le-Bretonneux (FR)

(73) Assignee: Saipem S.A., Montigny le Bretonneux (FR)

( * ) Notice: Subject to any disclaimer, the term of this patent is extended or adjusted under 35 U.S.C. 154(b) by 0 days.

(21) Appl. No.: 15/996,085

(22) Filed: Jun. 1, 2018

(65) Prior Publication Data
US 2018/0347549 A1    Dec. 6, 2018

(30) Foreign Application Priority Data

Jun. 2, 2017    (FR) ...................... 17 54937

(51) Int. Cl.
*F03D 80/50*    (2016.01)
*B66C 23/18*    (2006.01)
(Continued)

(52) U.S. Cl.
CPC ............. *F03D 80/50* (2016.05); *B62D 55/06* (2013.01); *B62D 57/024* (2013.01); *B66C 3/20* (2013.01);
(Continued)

(58) Field of Classification Search
CPC .......... F03D 80/50; F03D 13/25; B62D 55/06; B62D 57/024; B66C 3/20; B66C 23/185;
(Continued)

(56) References Cited

U.S. PATENT DOCUMENTS 7,934,585 B2 *  5/2011  Iversen ................... F03D 80/50
                                                    182/142
9,869,294 B2 *  1/2018  Lazaro .................... F03D 80/50
(Continued)

FOREIGN PATENT DOCUMENTS

CN    202879746    4/2013
CN    103130106    6/2013
(Continued)

OTHER PUBLICATIONS

Office Action dated Jun. 28, 2019 issued in Chinese Patent Application No. 201810562868.9.

*Primary Examiner* — Benjamin F Fiorello
(74) *Attorney, Agent, or Firm* — Cozen O'Connor

(57) ABSTRACT

A maintenance device for maintaining an offshore wind turbine, the device being suitable for pressing against and traveling along the pylon of the wind turbine. The device includes a maintenance platform including a preferably U-shaped notch so that the pylon of the wind turbine can penetrate into said notch and travel means for causing the maintenance platform to travel along the pylon of the wind turbine. The travel means comprising a plurality of motor-driven crawlers arranged under said maintenance platform so that when the pylon of the wind turbine is placed in said notch with the vertical longitudinal axis of the pylon of the wind turbine perpendicular to the work plane of said maintenance platform.

15 Claims, 8 Drawing Sheets

(51) Int. Cl.
  *B62D 55/06* (2006.01)
  *B62D 57/024* (2006.01)
  *E02B 17/00* (2006.01)
  *E04G 3/24* (2006.01)
  *F03D 13/25* (2016.01)
  *B66C 3/20* (2006.01)
  *E04G 3/28* (2006.01)

(52) U.S. Cl.
  CPC ........ *B66C 23/185* (2013.01); *E02B 17/0034* (2013.01); *E04G 3/243* (2013.01); *F03D 13/25* (2016.05); *B66C 2700/01* (2013.01); *E04G 2003/286* (2013.01); *F05B 2230/61* (2013.01)

(58) Field of Classification Search
  CPC . B66C 2700/01; E02B 17/0034; E04G 3/243; E04G 2003/286; F05B 2230/61
  See application file for complete search history.

(56) References Cited

U.S. PATENT DOCUMENTS

| | | | |
|---|---|---|---|
| 2007/0007074 A1* | 1/2007 | Lemburg | E04G 3/30 182/128 |
| 2011/0024233 A1* | 2/2011 | Lott | F03D 80/55 182/129 |
| 2016/0068373 A1* | 3/2016 | Chin | B63B 27/10 414/138.1 |
| 2019/0127032 A1* | 5/2019 | Prieto | B63B 39/03 |

FOREIGN PATENT DOCUMENTS

| | | | | |
|---|---|---|---|---|
| CN | 206108749 U | 4/2017 | | |
| DE | 102013002886 B3 | 3/2014 | | |
| EP | 2 319 755 | 5/2011 | | |
| EP | 2 219 986 | 5/2013 | | |
| EP | 3 019 433 | 5/2016 | | |
| KR | 20140085695 | 7/2014 | | |
| WO | WO 2015/003733 | 1/2015 | | |
| WO | WO-2016055067 A1 * | 4/2016 | ............ | F03D 13/10 |
| WO | WO 2017/032438 | 3/2017 | | |

* cited by examiner

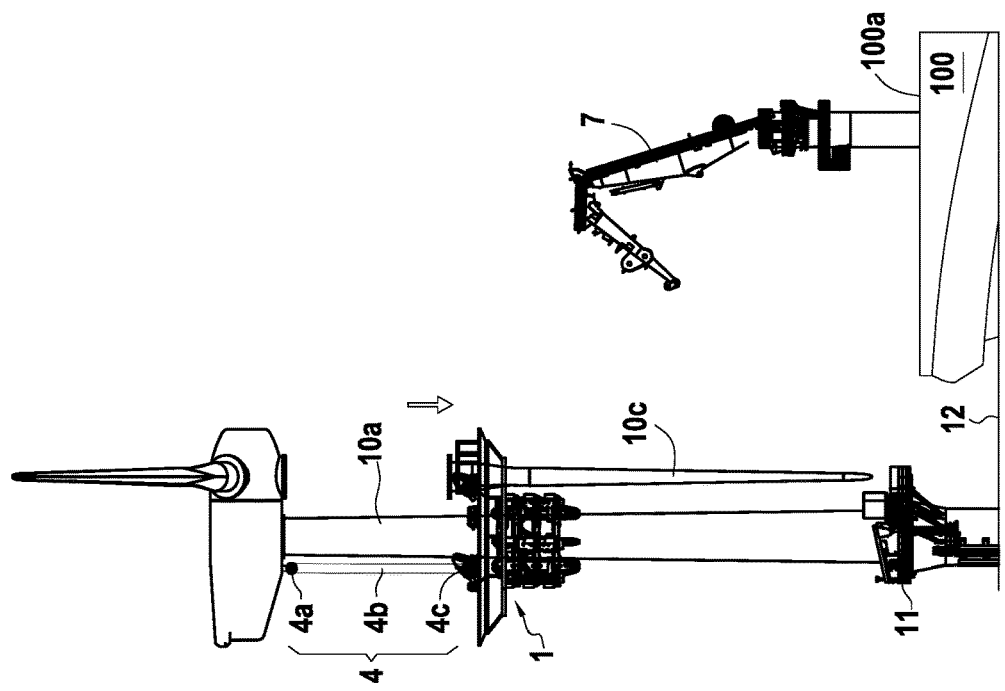
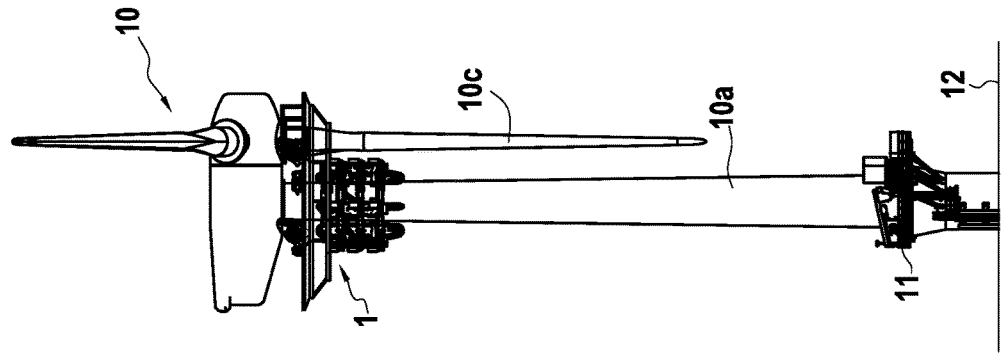
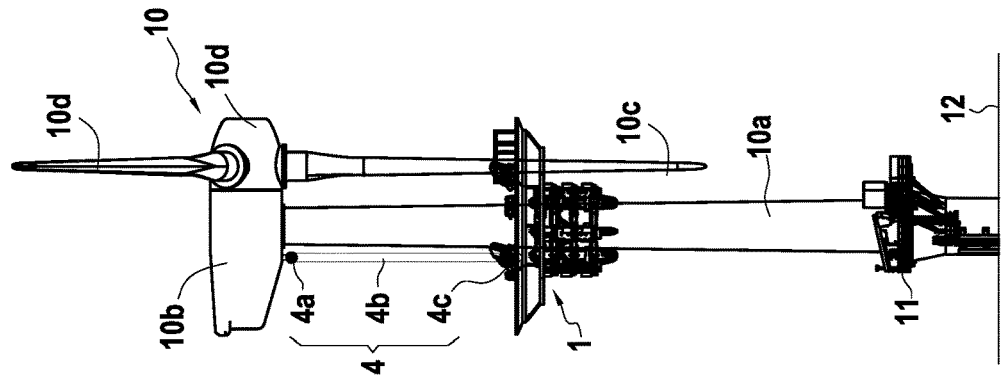

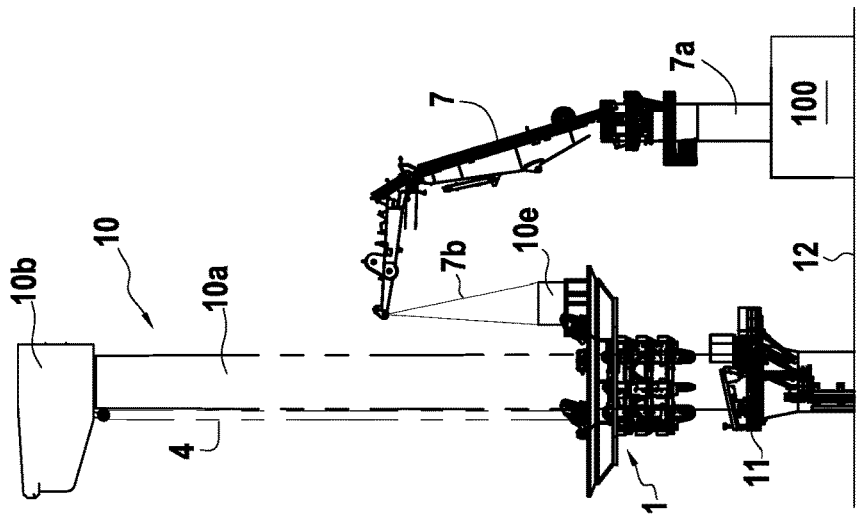
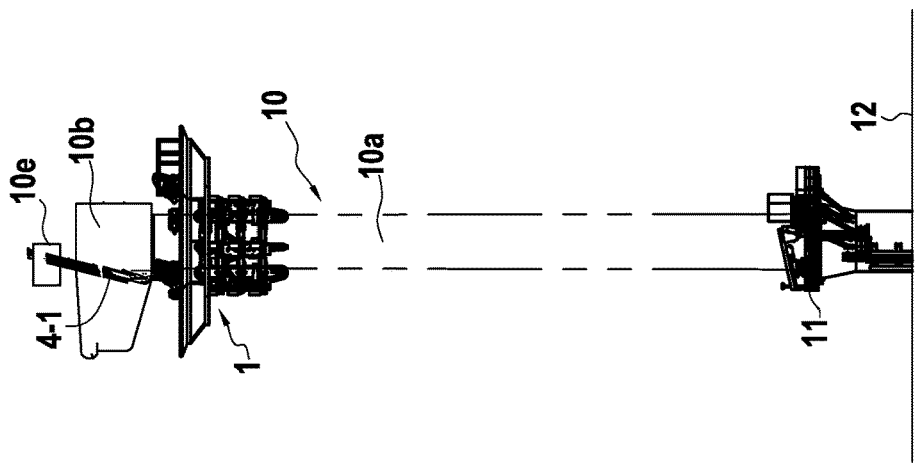
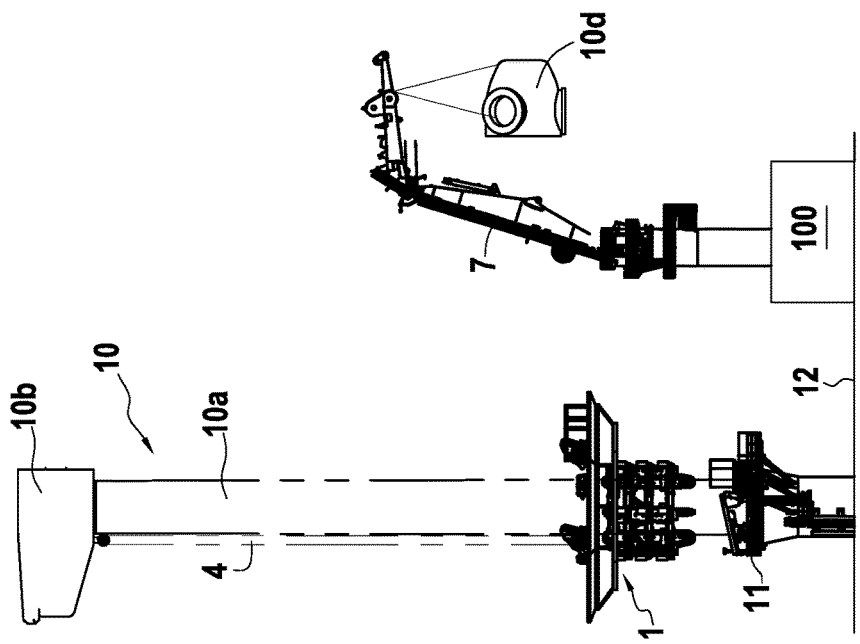

DEVICE AND A SHIP FOR MAINTAINING AN OFFSHORE WIND TURBINE

BACKGROUND OF THE INVENTION

1. Field of the Invention

The present invention relates to a maintenance device for maintaining an offshore wind turbine and that is suitable for being pressed against the pylon of the wind turbine and for traveling along the pylon of the wind turbine, and it also relates to a maintenance method using a wind turbine maintenance ship fitted with a maintenance device of the invention for maintaining an offshore wind turbine.

2. Description of the Related Art

The term "offshore wind turbine" is used herein to mean a wind turbine that is secured to the sea bottom or that is floating at sea.

The use of means for installing wind turbines can be extended to maintaining them and the technical means differ depending on whether the wind turbine is stationary or floating:

For wind turbines that are secured to the sea bottom or floating, technology exists to use self-hoisting barges or semi-submersible barges for maintenance purposes. Nevertheless, the availability of such means and/or their high cost of mobilization limits their use.

The technical problem to be solved is performing maintenance at heights of 100 meters (m) to 150 m above the water on a portion of the equipment of a wind turbine that needs to be removed from the top of the wind turbine, such as the hub, a blade, gearing, an alternator, or a nacelle, which equipment may weigh anything in the range 5 (metric) tonnes (t) to 150 t depending on the power of the wind turbine.

A hydraulic system for sliding along the pylon is known from CN 202879746, as are nautical means for lifting wind turbine components from EP 2 319 755, EP 3 019 433, and EP 2 219 986.

SUMMARY OF THE INVENTION

An object of the present invention is to provide an improved maintenance device that does not require major seagoing means such as a self-hoisting or semi-submersible barge, but that can be used with a simple service ship, suitable for being mobilized quickly.

To do this, the present invention provides a maintenance device for maintaining an offshore wind turbine, the device being suitable for pressing against and traveling along the pylon of the wind turbine, and comprising:

a maintenance platform including a notch, preferably an U-shaped notch defining two branches suitable for placing on either side of the pylon of the wind turbine so that the pylon of the wind turbine can penetrate into said notch with the vertical longitudinal axis of the pylon of the wind turbine being perpendicular to the work plane of the top surface of said maintenance platform; and travel means for causing said maintenance platform to travel along the pylon of the wind turbine in the vertical longitudinal axial direction of the pylon of the wind turbine, the travel means comprising a plurality of motor-driven crawlers arranged under said maintenance platform so that when the pylon of the wind turbine is placed in said notch with the vertical longitudinal axis of the pylon of the wind turbine perpendicular to the work plane of said maintenance platform, said crawlers having tracks are suitable for pressing against said pylon of the wind turbine and traveling along the pylon of the wind turbine.

It can be understood that the maintenance platform and the two branches it forms extend in a horizontal plane perpendicular to the vertical longitudinal axis of the pylon of the wind turbine when the maintenance device is moved in such a manner that the pylon of the wind turbine is received within said notch.

More particularly, said crawlers are suitable for being actuated:

either into a position in which they are relatively close together, in cross-section in a horizontal plane perpendicular to the vertical longitudinal axis of the pylon of the wind turbine, so that all of the tracks of said crawlers are pressed against said pylon of the wind turbine so as to make it possible to travel in translation along the pylon;

or else in a disengaged position in which they are relatively far apart, in cross-section in a horizontal plane perpendicular to the vertical longitudinal axis of the pylon of the wind turbine, in which position at least some of the tracks are moved away from the others so as to enable the maintenance device to be moved towards or away from said pylon.

More particularly, said travel means of said maintenance platform comprise n=3 to 6 crawlers arranged to press against said pylon of the wind turbine while being regularly spaced apart from one another in succession in cross-section in an horizontal plane perpendicular to the vertical longitudinal axis of the pylon of the wind turbine.

Still more particularly, a plurality of said crawlers are supported by at least one set of a plurality $\underline{n}$ of crawler support elements, each supporting a respective one of said crawlers, said crawler support elements being connected to one another in succession in hinged manner by swivel articulation devices of the type having a hinge about a swivel axis perpendicular to the work plane of the maintenance platform in order to enable the pylon of the wind turbine to be surrounded by said crawlers over a fraction of the circumference of the pylon of the wind turbine that is greater than half its circumference in cross-section when said crawlers are pressed against said pylon. It can be understood that:

the axes of rotation of the hinge type swivel articulation devices are parallel to one another and parallel to the vertical longitudinal axis of said pylon when the maintenance device is in position on the pylon; and when the crawler support elements are hinged to swivel relative to one another into an open or disengaged position, it is possible to move the maintenance device by positioning the pylon in said notch, and then to press the crawlers against the pylon by swivelling the crawler support elements relative to one another into a closed position, the set of crawler bearing against the pylon together forming a clamp around the pylon.

Still more particularly, the maintenance device comprises a plurality $\underline{p}$ of sets of a plurality $\underline{n}$ of crawler support elements each set supporting a respective said crawler, said $\underline{p}$ sets of said crawler support elements and said $\underline{p}$ said crawler support elements supporting a given crawler being spaced apart from one another in succession in the direction perpendicular to said work plane of said maintenance platform, $\underline{p}$ preferably being an integer in the range 2 to 4.

It can be understood that:
each crawler is supported by a plurality $p$ of said crawler support elements of the $p$ respective sets of said crawler support elements; and
said $p$ sets of said crawler support elements and said $p$ said crawler support elements supporting a given crawler are spaced apart from one another in succession in the longitudinal direction of said pylon when said crawlers are pressed against said periphery of said pylon.

Still more particularly, said crawlers include or are suitable for co-operating with presser means enabling each of said crawlers to be moved in a radial direction differentially along its length so as to enable them to press against and travel along a periphery of conical shape of said pylon of the wind turbine when they are pressed against said pylon.

It can be understood that said presser means of the crawlers allow each said crawler to slope along its length relive to the vertical at an angle that is the same as the half-angle at the apex of the cone of the peripheral surface of said pylon.

Still more particularly, said presser means allowing each said crawler to be moved radially in different manners along its length comprise a plurality $p$ of actuators mounted on the said crawler support elements supporting respective ones of the $p$ sets of said crawler support elements, said $p$ actuators being spaced apart from one another in succession in the longitudinal direction of said crawler.

Still more particularly, the maintenance device includes additional travel means comprising sheaves, cables, and winch devices suitable for enabling said maintenance platform to travel along the pylon of the wind turbine in the longitudinal axial direction of the pylon of the wind turbine.

More particularly, once the maintenance device is in place on the pylon of the wind turbine, it is secured by constant tension winches, each having its cable passing through a corresponding deflector sheave, previously fastened to the nacelle of the wind turbine. The maintenance platform travels in co-operation with the constant tension winches along the pylon of the wind turbine in order to gain access to the parts for being removed and then taken away back down along the pylon and presented to the seagoing support means for handling, storage, and transport.

Still more particularly, the maintenance device includes first grip and transfer means preferably comprising a first articulated-jib crane, which means are mounted on said maintenance platform and are suitable for gripping, lifting, and moving a portion of the equipment at the top of said wind turbine from the top of the wind turbine onto said maintenance platform when the maintenance device is in a high position against the pylon of the wind turbine.

The present invention also provides a wind turbine maintenance ship fitted with a maintenance device of the invention and for maintaining an offshore wind turbine, the ship preferably consisting in a single service ship suitable for being mobilized quickly, said maintenance ship being characterized in that it further includes second grip and transfer means arranged on a deck of the ship and suitable for transferring the maintenance device from the deck of the ship into a low position of a pylon of an offshore wind turbine such that the pylon of the wind turbine can be positioned in said notch with the vertical longitudinal axis of the pylon of the wind turbine being perpendicular to the work plane of the top surface of said maintenance platform, when said ship is in the proximity of said wind turbine.

More particularly, said second grip and transfer means of the maintenance device comprise or co-operate with a heave compensation platform suitable for keeping said maintenance device at a constant level in the vertical direction in the event of said ship being subjected to heave motion associated with movements of the sea.

Still more particularly, said second grip and transfer means include lift means, preferably an articulated-jib crane actuatable by an actuator, said lift means being suitable for being moved in translation on said compensation platform on which they rest, said compensation platform comprising at least one slide beam and at least two compensation actuators suitable for keeping said slide beam at a constant level in the vertical direction in the event of said ship being subjected to heave motion associated with movements of the sea.

Still more particularly, the ship further includes third grip and transfer means, preferably an articulated-jib crane, arranged on the deck of the ship and suitable for gripping, lifting, and moving a portion of the equipment of said wind turbine that is to be repaired or replaced, from said maintenance platform onto the deck of said maintenance ship when the maintenance device is in the low position against the pylon of the wind turbine in the proximity of said ship.

The present invention also provides a method of maintaining an offshore wind turbine using a maintenance ship of the invention, the method being characterized by performing the following successive steps:
a) transferring said maintenance device from said maintenance ship to the pylon of the wind turbine so that the pylon of the wind turbine is positioned in said notch between said two branches, with the vertical longitudinal axis of the pylon of the wind turbine perpendicular to the work plane of the top surface of said maintenance platform, said crawlers being in a disengaged position in which at least some of the tracks are moved away from the others so as to enable the maintenance device to be brought up to and positioned relative to said pylon; and
b) pressing said crawlers against said pylon of the wind turbine; and
c) actuating said travel means of said maintenance platform so as to cause said maintenance platform to climb up the pylon of the wind turbine along the longitudinal axial direction of the pylon of the wind turbine towards the top of the wind turbine; and
d) performing maintenance of the wind turbine from said maintenance platform; and
e) actuating said travel means so as to cause said maintenance platform to travel back down along the pylon of the wind turbine along the longitudinal direction of the pylon of the wind turbine towards the bottom of the wind turbine; and
f) transferring said portion of the equipment of the wind turbine from said maintenance platform onto the deck of a ship, preferably the deck of said maintenance ship, once the maintenance device is in a low position against the pylon of the wind turbine in the proximity of said maintenance ship; and
g) actuating said crawlers from their position pressing against said pylon of the wind turbine towards a disengaged position in which at least a fraction of the tracks are moved relative to the others so as to enable the maintenance device to be moved away from said pylon.

More particularly, the method of the invention comprises the characteristics whereby:
in step a), the maintenance device is lifted and moved in translation using second grip and transfer means comprising lift means, preferably an articulated-jib crane actuatable by an actuator, said lift means being moved in translation on a compensation platform on which they rest, said compensation platform comprising at least one slide beam and at least two compensation actuators suitable for keeping said slide beam at a constant level in the vertical direction in the event of said ship being subjected to heaving motion associated with movements of the sea; and in step b), said crawlers are actuated from a disengaged position towards a relative approach position in cross-section in a horizontal plane perpendicular to the vertical longitudinal axis of the pylon of the wind turbine so as to cause all of the tracks of said crawlers to press against said pylon of the wind turbine in order to make possible travel in translation along the pylon once the crawlers are actuated to rotate in step c);

in step d), once the maintenance device is in a high position against the pylon of the wind turbine, removing a portion of the equipment at the top of said wind turbine and placing it on said maintenance platform in order to be repaired or replaced, preferably using first grip and transfer means arranged on said maintenance platform; and in step f), transferring said portion of the equipment of the wind turbine from said maintenance platform onto the deck of a ship, preferably the deck of said maintenance ship, using third grip and transfer means, preferably an articulated-jib crane, arranged on the deck of said ship; and in step g), actuating said crawlers into a relatively disengaged position in cross-section in a horizontal plane perpendicular to the vertical longitudinal axis of the pylon of the wind turbine, in which disengaged position at least some of the tracks are moved relative to the others so to enable the maintenance device to be moved away from said pylon.

More particularly, said portion of the equipment at the top of said wind turbine is selected from a blade, a mechanical part for actuating blades in rotation such as a rotor, an electricity generator, and a nacelle.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Other characteristics and advantages of the present invention appear better on reading the following description made by way of non-limiting illustration and with reference to the accompanying drawings, in which:

FIGS. 7A to 7D show various positions of the maintenance device 1 along the wind turbine pylon 10a in order to remove a blade 10c for maintenance on board the maintenance ship 100.

FIGS. 8A to 8C show various steps for removing the rotor 10d from the top of the wind turbine for repair or maintenance on the deck of the ship.

FIGS. 9A and 9B show various steps for removing the generator 10e in the nacelle 10b at the top of the wind turbine and transferring it to the deck of the ship.

DETAILED DESCRIPTION OF THE PRESENTLY PREFERRED EMBODIMENTS

Figures 4A, 4B:
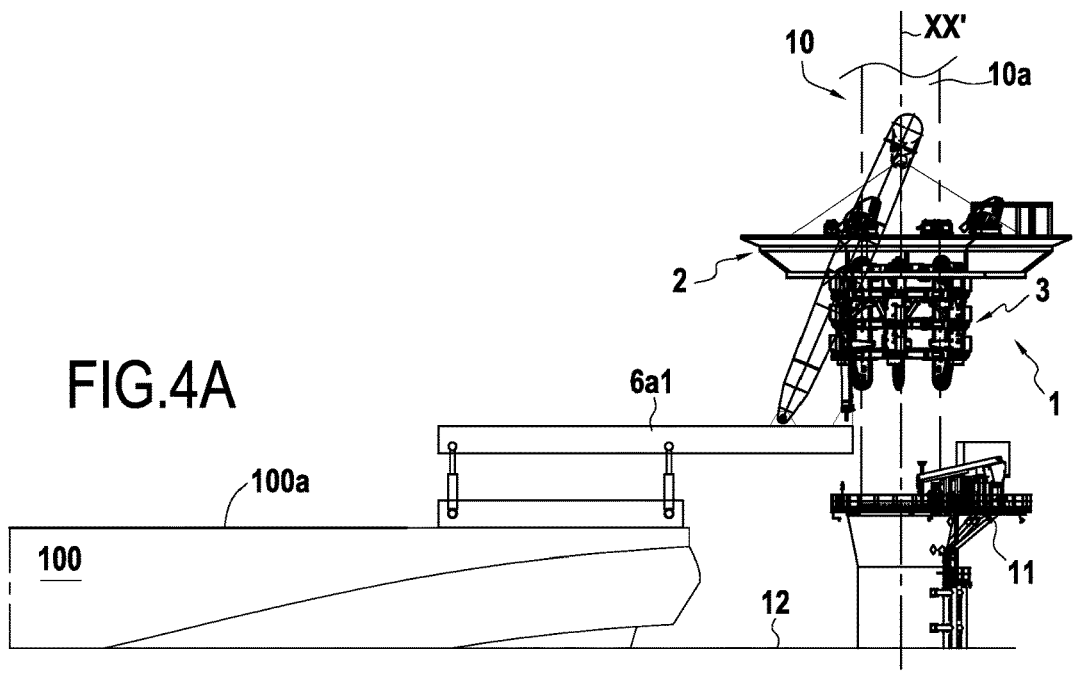
FIGS. 4A and 4B show the maintenance device 1 with the pylon 10a of the wind turbine positioned on the axis of the notch 2a in the maintenance platform 2.
Figure 5A:
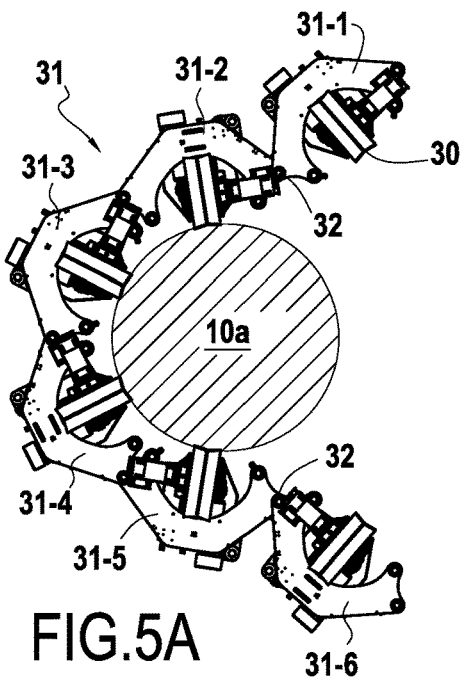
FIGS. 5A and 5B show sets 31 of crawler support elements 31-1 to 31-6 in a disengaged position (FIG. 5A) around the pylon 10a of the wind turbine, and in a position for pressing the crawlers 30 against the pylon 10a of the wind turbine (FIG. 5B).
Figure 5B:
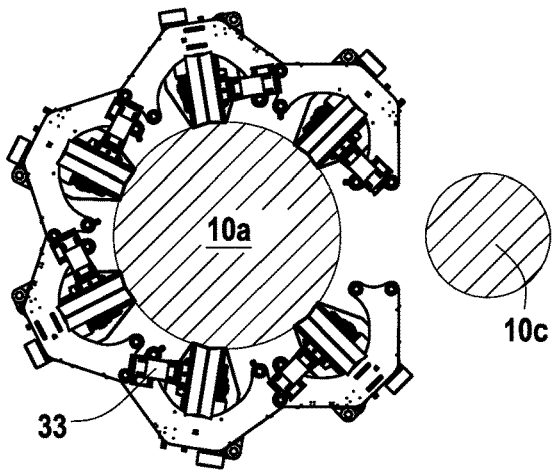
Figure 6:
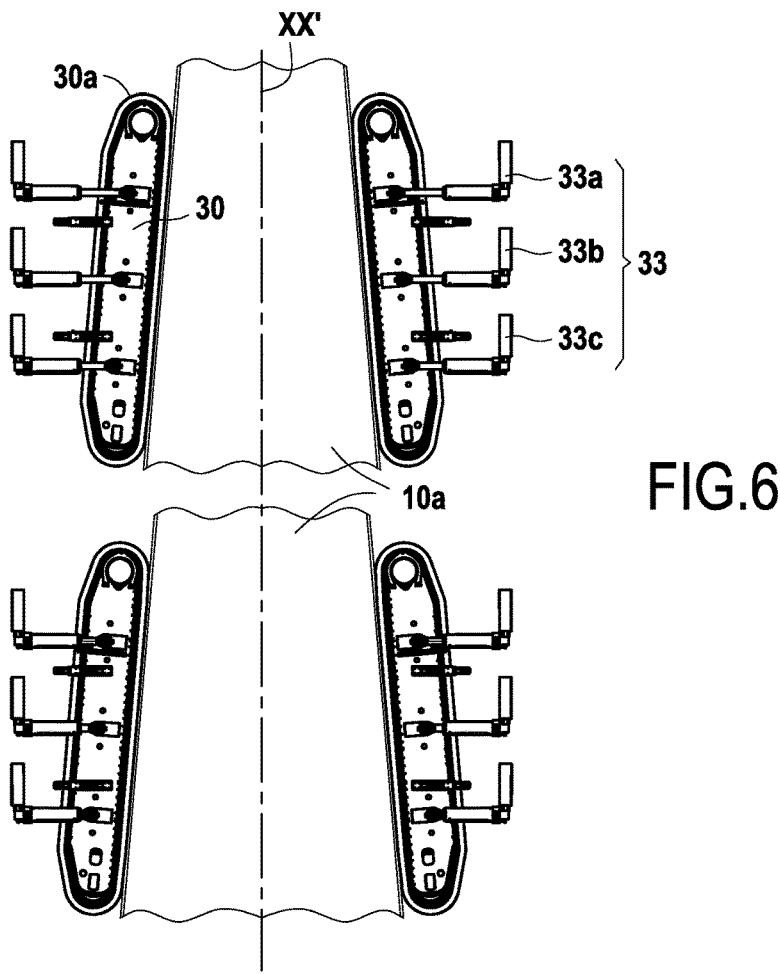
FIG. 6 is a vertical longitudinal section view showing two crawlers pressed in diametrically opposite manner against a wind turbine pylon 10a of frustoconical shape, shown in two different positions in longitudinal travel along the axis XX' of said pylon.

FIGS. 1A, 1B, 4B and 5A, 5B, and also FIG. 6 show a maintenance device 1 of the invention comprising a platform 2 having a top work plane 2b of octagonal outline, with one of its sides being notched by a lateral notch 2a that terminates in an internal outline of semicircular shape about the vertical axis X1X1' of the platform, which axis X1X1' is to coincide with the axis XX' of the pylon 10a of a wind turbine 10 when said platform is in position around said pylon, as described below. The lateral notch 2a has two branches 2b1 and 2b2 in the work plane 2b of the platform 2 that are arranged symmetrically on either side of an axis Y1Y1' perpendicular to the axis X1X1'.

The maintenance platform 2 supports various pieces of equipment such as winches and/or tools 4c, 5c together with a first articulated-jib crane 4-1, as described below.

Figure 1A:
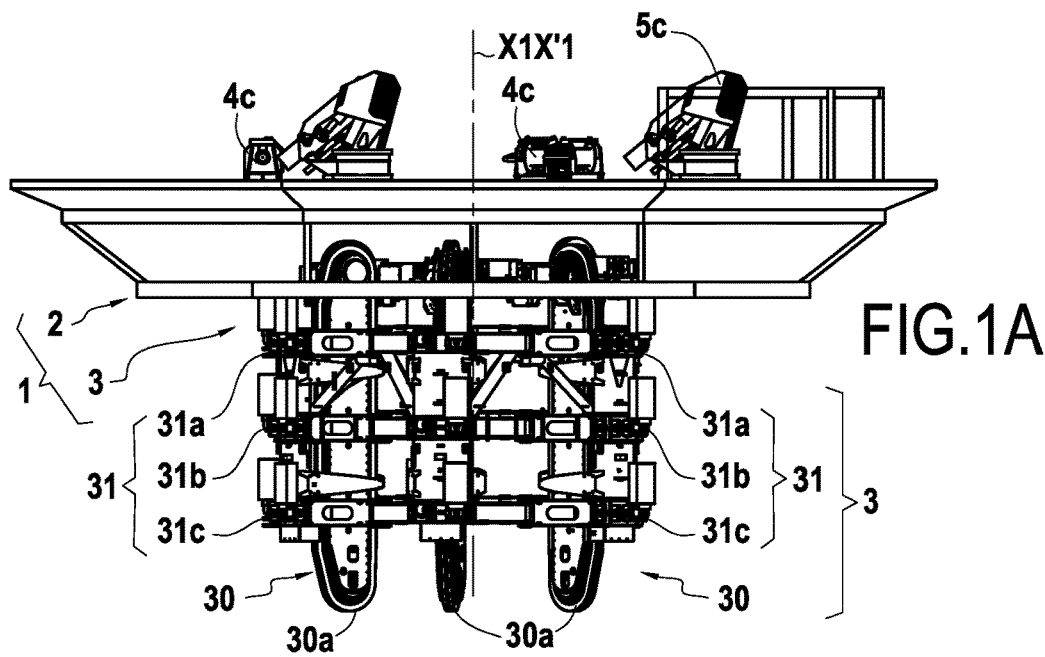
FIGS. 1A and 1B are a side view (FIG. 1A) and a plan view (FIG. 1B) of a maintenance device 1 of the invention.
Figure 1B:
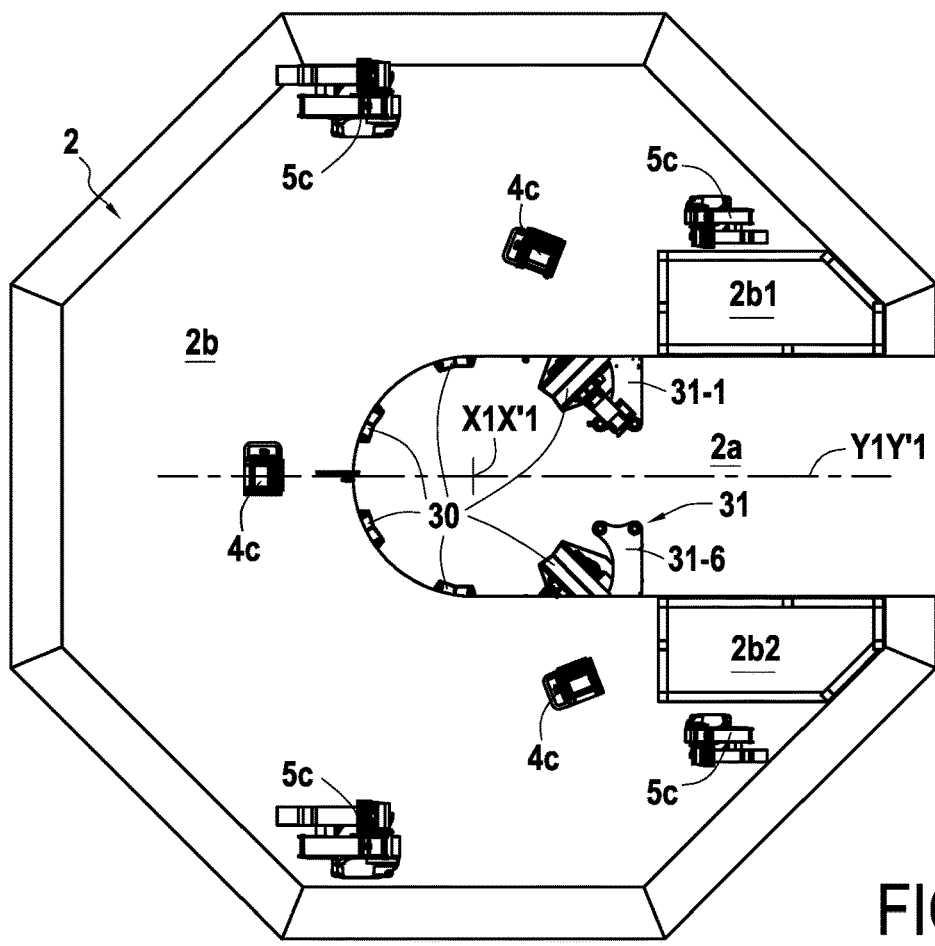
Figure 1C:
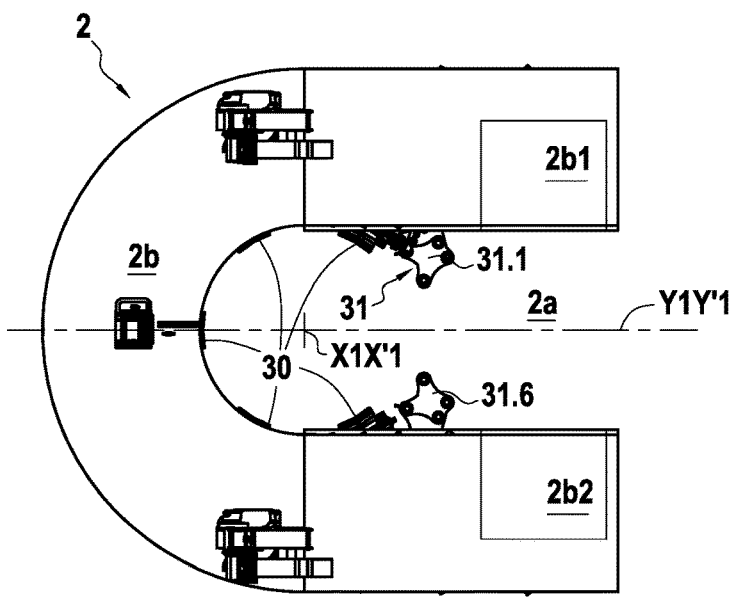
FIG. 1C shows a lighter variant embodiment of a maintenance device 1 of the invention, in plan view.

In FIG. 1C, there can be seen a simplified version of the maintenance device, in which the maintenance platform presents a work plane 2ba that is U-shaped with a semicircular portion that is extended by two rectangular lateral branches 2b1, 2b2 defining the notch 2a.

On the underside of the platform 2 there are motor-driven travel means 3 constituted by a set of six crawlers 30 supported by a group 31 of three sets of superposed crawler supports 31a, 31b, 31c that are spaced apart from each other in the axial direction X1X1' along said crawlers 30. Each set 31a, 31b, and 31c is constituted by six crawler support elements 31-1 to 31-6, that are connected to one another in succession by hinge-type articulation devices 32 that are hinged about respective hinge axes perpendicular to the work plane 2b and thus parallel to the longitudinal axis X1X1'. A swivel hinge is required for at least two of the end crawler support elements 31-1 and 31-6 so that they can adopt:

an open or disengaged position, as shown in FIG. 5A, which allows the maintenance device 1 to move in translation so as to position the pylon 10a coaxially in said notch 2a, such that the tracks 30a of the crawlers 30 supported by the other crawler elements 31-2 to 31-5 press against a portion of the circumference of the pylon 10a, while covering a portion of the circumference of said pylon that is less than half the circumference of said pylon; and a closed or bearing position in which the two end crawler support elements 31-1 and 31-6 are swivelled so that the tracks 30a of the crawlers 30 that they support also come to bear against the circumference of the pylon 10a, such that the set of tracks constitutes a clamp clamped around the pylon 10a, said tracks covering a portion of the circumference of the pylon that is greater than half its circumference in a transverse direction, when said crawlers are pressed against said pylon.

In FIG. 6, it can be seen that the crawler support elements 31-1 to 31-6 also support actuators 33a to 33c constituting presser means enabling each said crawler to be moved radially in differential manner along its length so as to enable said crawlers to be at a slope along their length relive to the axis XX' of said pylon, thereby enabling the tracks 30a of the crawlers to press against and move along the periphery of a pylon that is conical in shape.

In FIG. 6, each of the crawlers co-operates with a respective actuator from pluralities of six actuators 33a, of six actuators 33b, and of six actuators 33c, supported by the six crawler support elements 31-1, 31-6 of each of the three superposed sets of crawler support elements 31a-31c.

When all of the tracks 30a of the crawlers 30 are pressed against the pylon 10a, the maintenance device 1 can be moved by driving the tracks of said crawlers in rotation so that they travel longitudinally along the pylon.

The maintenance platform 2 supports the winches 4c that act via cables 4b passing through deflection sheaves 4a mounted on the underface of the nacelle 10b at the top of the wind turbine to move the maintenance device 1 along the pylon and to constitute additional travel means 4, providing safety backup for the main travel means 3. In order to put the deflection sheaves 4a in place on the underface of the nacelle 10b, the maintenance device 1 is raised to the top of the wind turbine and the cable 4b is passed around the deflector sheave 4a, as shown in FIG. 7A.

Figure 2A:
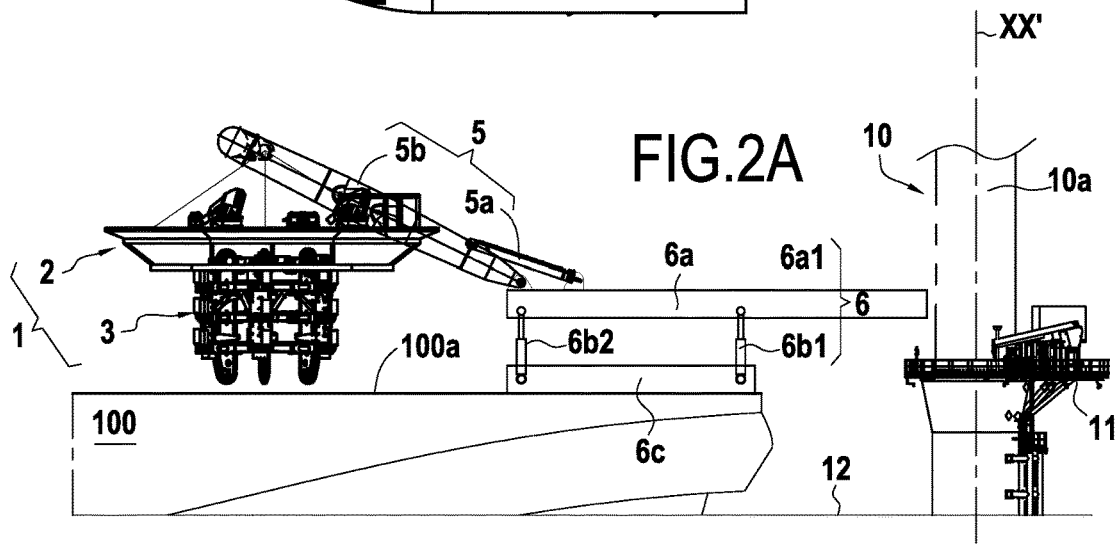
FIGS. 2A and 2B are respectively a side view and a plan view of a maintenance device of the invention hoisted by grip and transfer means 5 resting on a heave compensation platform 6 above the deck of a ship.
Figure 2B:
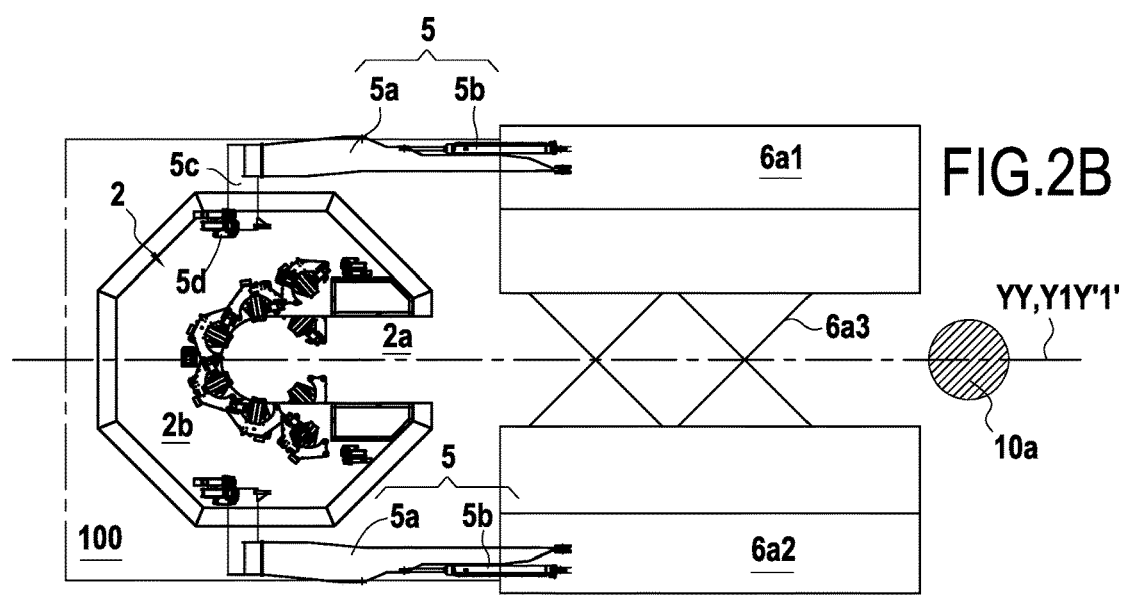

In FIGS. 2 to 4, there can be seen a maintenance ship 100 in the proximity of a wind turbine 10 having a bottom peripheral work platform 11 situated above the level of the sea 12. The deck 100a of the maintenance ship 100 supports a heave compensation platform 6 having two parallel slide beams 6a1, 6a2 that are connected together by reinforcement 6a3 and that are arranged symmetrically relative to the axis YY' of the ship 100. Each side beam 6a1, 6a2 is supported by two actuators 6b1, 6b2 that are spaced apart in the longitudinal direction YY' of the two beams. The actuators 6b1, 6b2 are supported at their bottom ends by a beam 6c resting on the deck 100a, and the top ends of the actuators 6b1 and 6b2 co-operate with each slide beam 6a1, 6a2, which slide beams are arranged in parallel and side by side.

Each slide beam 6a1, 6a2 supports a crane 5 consisting in a jib 5b articulated by an actuator 5a, the two cranes 5 being suitable for lifting the maintenance device 1 using cables 5c co-operating with winches 5c on the work plane 2 when the maintenance device 1 is arranged with the axis Y1Y1' of the notch 2a coinciding with the axis YY' of the ship relative to which the two slide beams are arranged symmetrically.

Figure 3A:
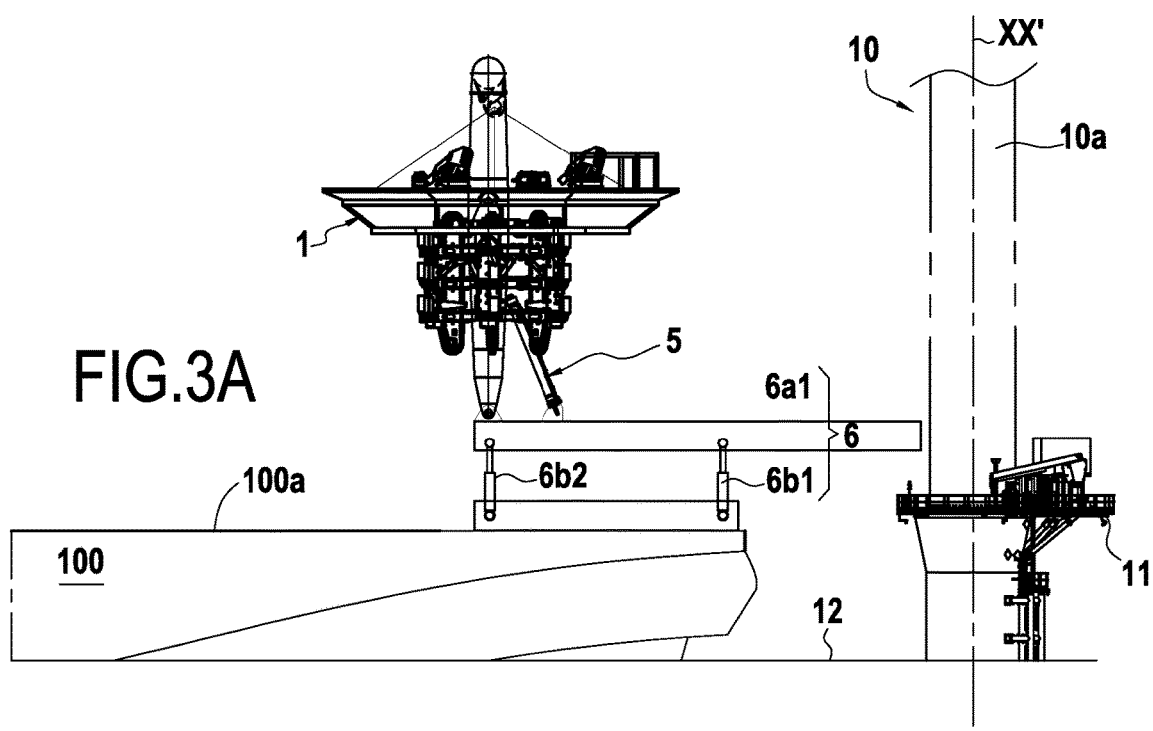
FIGS. 3A and 3B show the maintenance device 1 of the invention in its position hoisted by the grip and transfer means 5 prior to being moved in translation on a slide beam 6a1 (FIG. 3A) and after moving in translation on the slide beam (FIG. 3B).
Figure 3B:
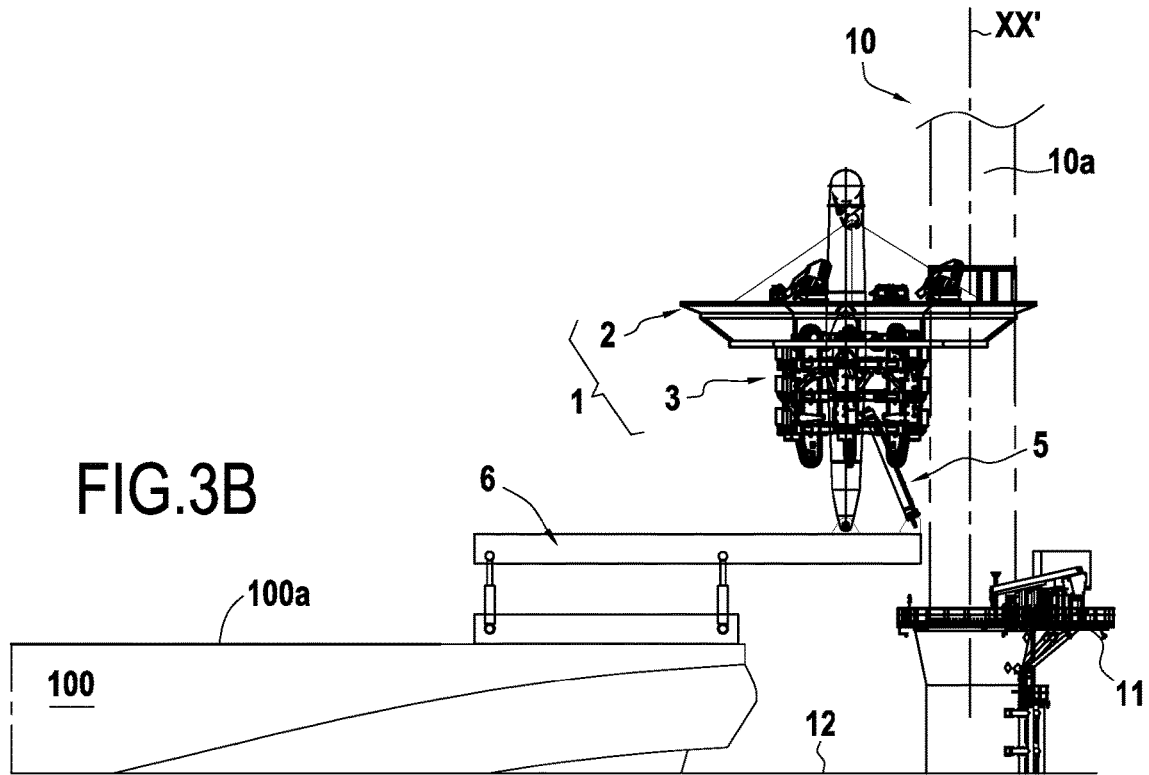

FIG. 3A shows the maintenance device 1 being lifted using grip and transfer means 5 prior to being moved in translation on the slide beams 6a1, 6a2 as far as the ends of the beam so as to come into the proximity of the pylon 10a of the wind turbine, as shown in FIG. 3B.

In FIG. 4A, the crane 5 is tilted again so as to position the axis XX' of the pylon 10a on the axis X1X1' of the semicircular termination of the notch 2a, the crawlers being in the open position as shown in FIG. 5A. Thereafter, said crawlers 30 are actuated to occupy the closed position so as to press against the pylon 10a, as shown in FIG. 5B and FIG. 4B.

Figure 7D:
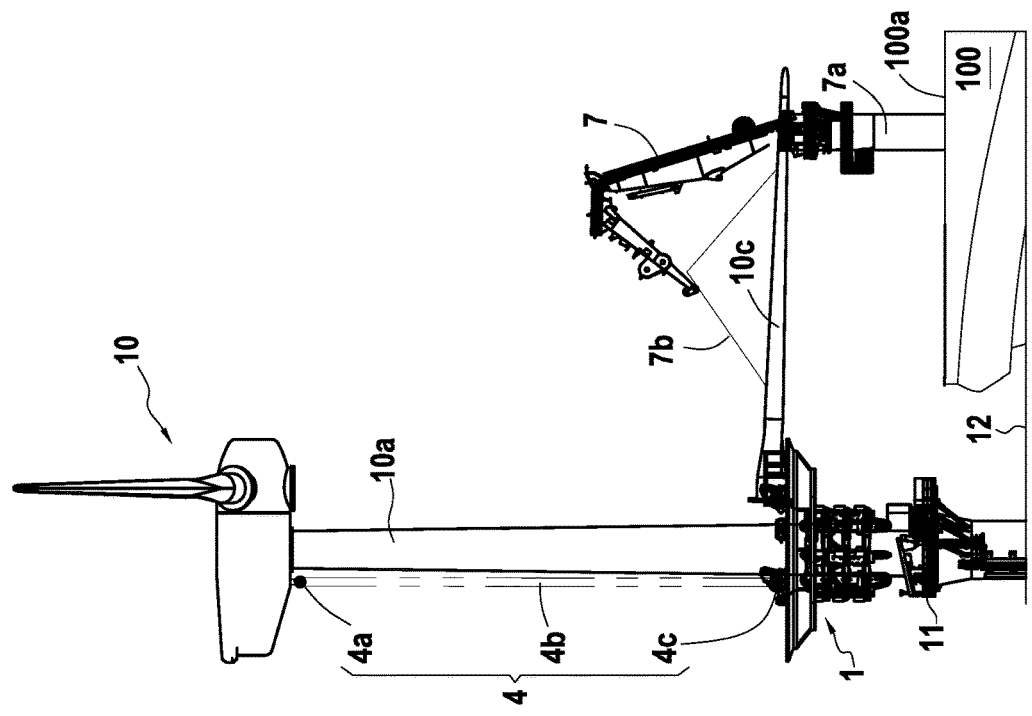

FIG. 7A shows the maintenance device 1 traveling towards the top of the pylon of the wind turbine. FIGS. 7B and 7C show a blade 10e of the wind turbine being disconnected and then lowered onto the platform 2 of the maintenance device 1. FIG. 7D shows the blade 10c suspended from a sling 7b being gripped and transferred using a crane 7 at the top of a post 7a on the deck 100a of the ship 100, the blade being taken from the maintenance platform 2 and placed on the deck 100a of the ship.

Figure 8B:
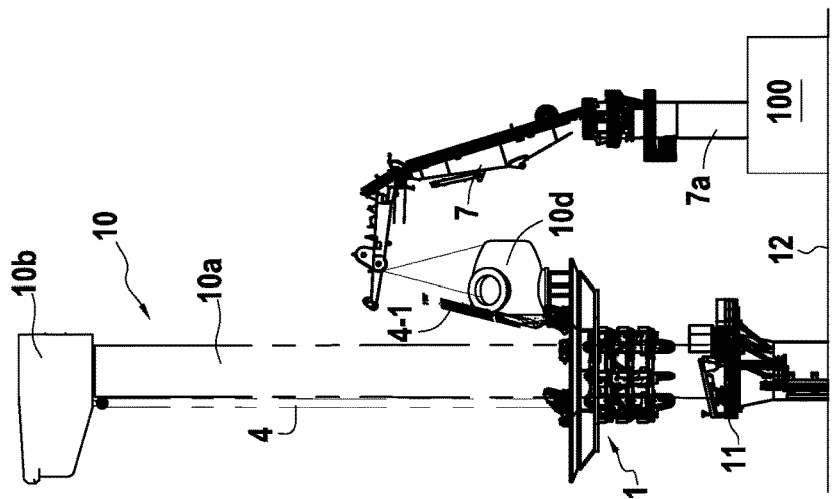
Figure 8A:
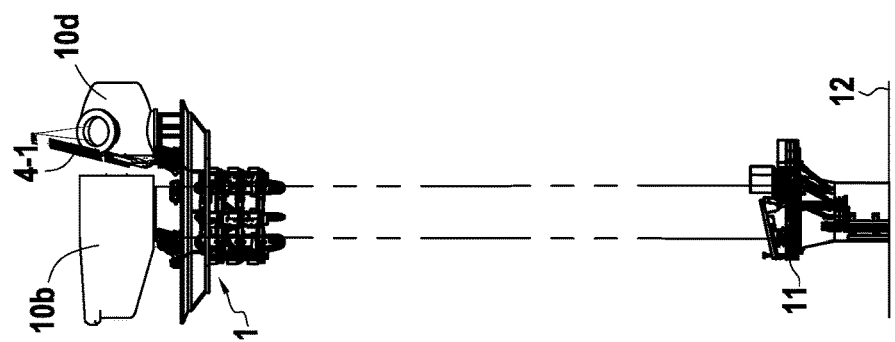

FIGS. 8A to 8C show:

the rotor 10d of the top of the wind turbine being taken hold of and transferred using a crane 4-1 arranged on the platform 2 while the maintenance device 1 is at the top of the pylon 10a; then the rotor 10d being gripped and transferred using the crane 7 on the deck of the ship 100, once the maintenance device has come back down to the bottom of the pylon 10a.

The same operations are performed using the cranes 4-1 and 7 for recovering and maintaining the generator 10e of the wind turbine, as can be seen in FIGS. 9A and 9B.

In FIGS. 7C, 7D, 8C, and 9B, the ship 100 to which the maintenance device has just transferred parts equipping the wind turbine, namely the rotor, the generator, and the nacelle, is not necessarily the same as the ship 100 that transferred the maintenance device to the wind turbine pylon. It may be a second ship having a grip device 7, even though it is nevertheless preferably the maintenance ship 100.

A method of maintaining an off-shore wind turbine 10 using a maintenance ship 100 of the invention comprises the following successive steps.

a) Transferring said maintenance device 1 from said maintenance ship to the wind turbine pylon 10a so that the pylon of the wind turbine is positioned in said notch 2a between said two branches 2a1, 2a2 with the vertical longitudinal axis XX' of the pylon of the wind turbine coinciding with the axis X1X1' of the top surface of said maintenance platform, said crawlers being in the disengaged position in which the two tracks 30a of the crawlers supported by the end support elements 31-1 and 31-6 are swivelled into an open position relative to the others, so as to enable the maintenance device to approach said pylon and be put into position relative thereto.

To do this, the maintenance device 1 is previously lifted above the deck 100a by a cable 5c using an articulated-jib craned 5a that is actuatable by an actuator 5b. Said crane 5 lifting the maintenance device 1 is moved in translation on the two slide beams 6a1, 6a2, each supported by the two actuators 6b1, 6b2 so as to form a compensation platform 6 suitable for keeping said slide beam at a constant level in the vertical direction in spite of heave motion of said ship associated with movements of the sea.

b) Said crawlers 30 supported by the end support elements 31-1 and 31-6 are caused to bear against said pylon of the wind turbine.

c) Said travel means 3 of said maintenance platform are actuated so as to cause said maintenance platform 2 to climb along the pylon of the wind turbine 10a along the longitudinal axial direction XX' of the pylon of the wind turbine towards the top of the wind turbine.

d) A portion of the equipment 10c-10e at the top of said wind turbine that needs to be repaired or replaced is removed and put on said maintenance platform using an articulated-jib crane 4-1 arranged on said maintenance platform 2, while the maintenance device 1 is in its high position against the pylon 10a of the wind turbine.

e) Said travel means 3 are actuated so as to cause said maintenance platform 2 to move back down along the pylon 10a of the wind turbine along the longitudinal axial direction (XX') of the pylon of the wind turbine towards the bottom of the wind turbine.

f) Said portion of the wind turbine equipment 10c-10e is transferred from said maintenance platform 2 onto the duct 100a of said maintenance ship 100 while the maintenance device 1 is in its low position against the pylon 10a of the wind turbine close to said maintenance ship 100, by using an articulated-jib crane 7 arranged on the deck of the ship.

g) Said crawlers 30 are actuated from their position bearing against said pylon of the wind turbine towards a disengaged position in which the crawlers supported by the end support elements 31-1 and 31-6 are moved relative to the others into a disengaged or open position, in order to enable the maintenance ship to move away and the maintenance device to be taken in charge by the crane 5 on the ship 100 relative to said pylon.

More particularly, the entire travel tool of the maintenance device is constituted by four to six crawler trains fitted with tracks and capable of taking up a force of 2750 kilonewtons (kN) to 3000 kN on the axis of the pylon. The speed required is slow and the power demanded remains reasonable, being about 200 kilowatts (kW).

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A maintenance device for maintaining an offshore wind turbine, the device being suitable for pressing against and traveling along a pylon of the wind turbine, and comprising:
   a maintenance platform including a notch defining two branches suitable for placing on either side of the pylon of the wind turbine so that the pylon of the wind turbine can penetrate into said notch with the vertical longitudinal axis XX' of the pylon of the wind turbine being perpendicular to a work plane of a top surface of said maintenance platform; and
   travel means for causing said maintenance platform to travel along the pylon of the wind turbine in the vertical longitudinal axial direction XX' of the pylon of the wind turbine, the travel means comprising a plurality of motor-driven crawlers arranged under said maintenance platform so that when the pylon of the wind turbine is placed in said notch with the vertical longitudinal axis of the pylon of the wind turbine perpendicular to the work plane of said maintenance platform, said crawlers having tracks are suitable for pressing against said pylon of the wind turbine and traveling along the pylon of the wind turbine.

2. The maintenance device for an offshore wind turbine according to claim 1, wherein said travel means of said maintenance platform comprises a plurality of n=3 to 6 crawlers arranged to press against said pylon of the wind turbine while being regularly spaced apart from one another in succession in cross-section in an horizontal plane perpendicular to the vertical longitudinal axis XX' of the pylon of the wind turbine.

3. The maintenance device for an offshore wind turbine according to claim 1, wherein a plurality of said crawlers are supported by at least one set of a plurality $\underline{n}$ of crawler support elements, each supporting a respective one of said crawlers, said crawler support elements being connected to one another in succession in hinged manner by swivel articulation devices of the type having a hinge about a swivel axis perpendicular to the work plane of the maintenance platform in order to enable the pylon of the wind turbine to be surrounded by said crawlers over a fraction of the circumference of the pylon of the wind turbine that is greater than half its circumference in cross-section when said crawlers are pressed against said pylon.

4. The maintenance device for an offshore wind turbine according to claim 1, characterized in that it comprises a plurality $\underline{p}$ of sets each of a plurality $\underline{n}$ of crawler support elements each set supporting a respective said crawler, said p sets of said crawler support elements and said $\underline{p}$ said crawler support elements supporting a given crawler being spaced apart from one another in succession in the direction perpendicular to said work plane of said maintenance platform.

5. The maintenance device for an offshore wind turbine according to claim 1, wherein said crawlers include or are suitable for co-operating with presser means enabling each of said crawlers to be moved in a radial direction differentially along its length so as to enable them to press against and travel along a periphery of conical shape of said pylon of the wind turbine when they are pressed against said pylon.

6. The maintenance device for an offshore wind turbine according to claim 5, wherein said presser means allowing each said crawler to be moved radially in different manner along its length comprise a plurality $\underline{p}$ of actuators mounted on the said crawler support elements of respective ones of the $\underline{p}$ sets of said crawler support elements, said $\underline{p}$ actuators being spaced apart from one another in succession in the longitudinal direction of said crawler.

7. The maintenance device for an offshore wind turbine according to claim 1, characterized in that it includes additional travel means comprising sheaves, cables, and winch devices suitable for enabling said maintenance platform to travel along the pylon of the wind turbine in the vertical longitudinal axial direction XX' of the pylon of the wind turbine.

8. The maintenance device for an offshore wind turbine according to claim 1, characterized in that it includes first grip and transfer means which means are mounted on said maintenance platform and are suitable for gripping, lifting, and moving a portion of the equipment at the top of said wind turbine from the top of the wind turbine onto said maintenance platform when the maintenance device is in a high position against the pylon of the wind turbine.

9. A wind turbine maintenance ship fitted with a maintenance device according to claim 1, for maintaining an offshore wind turbine, said maintenance ship further comprising a second grip and transfer means arranged on a deck of the ship and suitable for transferring the maintenance device from the deck of the ship into a low position of a pylon of an offshore wind turbine such that the pylon of the wind turbine can be positioned in said notch with the vertical longitudinal axis of the pylon of the wind turbine being perpendicular to the work plane of the top surface of said maintenance platform, when said ship is in the proximity of said wind turbine.

10. The maintenance ship according to claim 9, wherein said second grip and transfer means of the maintenance device comprise or co-operate with a heave compensation platform suitable for keeping said maintenance device at a constant level in the vertical direction in the event of said ship being subjected to heave motion associated with movements of the sea.

11. The wind turbine maintenance ship according to claim 10, wherein said second grip and transfer means include lift means, said lift means being suitable for being moved in translation on said compensation platform on which they rest, said compensation platform comprising at least one slide beam and at least two compensation actuators suitable for keeping said slide beam at a constant level in the vertical direction in the event of said ship being subjected to heave motion associated with movements of the sea.

12. The wind turbine maintenance ship according to claim 9, wherein a third grip and transfer means are arranged on the deck of the ship and are suitable for gripping, lifting, and moving a portion of the equipment of said wind turbine that is to be repaired or replaced, from said maintenance platform onto the deck of said maintenance ship when the maintenance device is in the low position against the pylon of the wind turbine in the proximity of said ship.

13. A method of maintaining an offshore wind turbine using a maintenance ship according to claim 9, the method comprising the following successive steps:
 a) transferring said maintenance device from said maintenance ship to the pylon of the wind turbine so that the pylon of the wind turbine is positioned in said notch between said two branches, with the vertical longitudinal axis of the pylon of the wind turbine perpendicular to the work plane of the top surface of said maintenance platform, said crawlers being in a disengaged position in which at least some of the tracks are moved away from the others so as to enable the maintenance device to be brought up to and positioned relative to said pylon; and
 b) pressing said crawlers against said pylon of the wind turbine; and
 c) actuating said travel means of said maintenance platform so as to cause said maintenance platform to climb up the pylon of the wind turbine along the vertical longitudinal axial direction XX' of the pylon of the wind turbine towards the top of the wind turbine; and
 d) performing maintenance of the wind turbine from said maintenance platform; and
 e) actuating said travel means so as to cause said maintenance platform to travel back down along the pylon of the wind turbine along the vertical longitudinal direction XX' of the pylon of the wind turbine towards the bottom of the wind turbine; and
 f) transferring said portion of the equipment of the wind turbine from said maintenance platform onto the deck of said maintenance ship, once the maintenance device is in a low position against the pylon of the wind turbine in the proximity of said maintenance ship; and
 g) actuating said crawlers from their position pressing against said pylon of the wind turbine towards a disengaged position in which at least a fraction of the tracks are moved relative to the others so as to enable the maintenance device to be moved away from said pylon.

14. The method according to claim 13, wherein:
 in step a), the maintenance device is lifted and moved in translation using second grip and transfer means (5) comprising lift means (5a-5b), said lift means being moved in translation on a compensation platform on which they rest, said compensation platform comprising at least one slide beam and at least two compensation actuators suitable for keeping said slide beam at a constant level in the vertical direction in the even of said ship being subjected to heaving motion associated with movements of the sea; and
 in step b), said crawlers are actuated from a disengaged position towards a relative approach position in cross-section in a horizontal plane perpendicular to the vertical longitudinal axis of the pylon of the wind turbine so as to cause all of the tracks of said crawlers to press against said pylon of the wind turbine in order to make possible travel in translation along the pylon once the crawlers are actuated to rotate in step c);
 in step d), once the maintenance device is in a high position against the pylon of the wind turbine, removing a portion of the equipment at the top of said wind turbine and placing it on said maintenance platform in order to be repaired or replaced, using first grip and transfer means arranged on said maintenance platform; and
 in step f), transferring said portion of the equipment of the wind turbine from said maintenance platform onto the deck of said maintenance ship, using third grip and transfer means; and
 in step g), actuating said crawlers into a relatively disengaged position in cross-section in a horizontal plane perpendicular to the vertical longitudinal axis of the pylon of the wind turbine, in which disengaged position at least some of the tracks are moved relative to the others so to enable the maintenance device to be moved away from said pylon.

15. The method according to claim 14, wherein said portion of the equipment at the top of said wind turbine is selected from a blade, a mechanical part for actuating blades in rotation, an electricity generator, and a nacelle.

* * * * *